(12) United States Patent
Pozzati

(10) Patent No.: US 7,565,913 B2
(45) Date of Patent: *Jul. 28, 2009

(54) METAL VALVE STEM SEAL AND SEALING SYSTEM

(75) Inventor: Roberto Pozzati, Busto Arsizio (IT)

(73) Assignee: PetrolValves, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/593,399

(22) PCT Filed: Nov. 5, 2004

(86) PCT No.: PCT/US2004/036827

§ 371 (c)(1),
(2), (4) Date: Sep. 27, 2007

(87) PCT Pub. No.: WO2006/052237

PCT Pub. Date: May 18, 2006

(65) Prior Publication Data

US 2009/0001307 A1    Jan. 1, 2009

(51) Int. Cl.
*F16J 15/18* (2006.01)

(52) U.S. Cl. .................. 137/375; 251/214; 277/553; 277/567

(58) Field of Classification Search ............ 251/214; 137/375; 277/553, 556, 567
See application file for complete search history.

(56) References Cited

U.S. PATENT DOCUMENTS

| | | | |
|---|---|---|---|
| 3,830,508 A | 8/1974 | Endicott | |
| 4,029,294 A | 6/1977 | McCaskill et al. | |
| 4,160,551 A | 7/1979 | Nixon et al. | |
| 4,229,027 A | 10/1980 | Morrill | |
| 4,264,054 A | 4/1981 | Morrill | |
| 4,363,465 A | 12/1982 | Morrill | |
| 4,381,114 A | 4/1983 | Vanderford, Jr. | |
| 4,410,189 A | 10/1983 | Myers et al. | |
| 4,510,960 A | 4/1985 | Jennings et al. | |
| 4,516,752 A | 5/1985 | Babbitt et al. | |
| 4,560,109 A | 12/1985 | Teruyuki et al. | |
| 4,638,833 A | 1/1987 | Wolcott, II | |
| 4,643,440 A | 2/1987 | Massey, Jr. | |
| 4,658,847 A | 4/1987 | McCrone | |

(Continued)

FOREIGN PATENT DOCUMENTS

WO    WO 2006/052237 A1    5/2006

*Primary Examiner*—John Bastianelli
(74) *Attorney, Agent, or Firm*—McAndrews, Held & Malloy, Ltd.

(57) ABSTRACT

The present invention is directed to a metal valve stem seal and sealing system comprising a valve body; a metal valve stem housed within the valve body; a bonnet member housed within the valve body; a U-shaped metal stem gasket positioned between the metal valve stem and the bonnet member, wherein the gasket has a first lip member and a second lip member each having an interior surface and an exterior surface; a metal wedge ring fitted between the first and second lip members; and, at least one metal energizing spring adjacent the wedge ring, wherein the metal energizing spring applies a sufficient force to the wedge ring to cause the wedge ring to apply a sufficient contact pressure to the first and second lip members to form a seal between the gasket and the metal valve stem and to form a seal between the gasket and the bonnet member.

19 Claims, 3 Drawing Sheets

U.S. PATENT DOCUMENTS

| | | |
|---|---|---|
| 4,886,241 A | 12/1989 | Davis et al. |
| 4,907,812 A | 3/1990 | Meyer |
| 5,031,923 A | 7/1991 | Davies |
| 5,092,609 A | 3/1992 | Balzano et al. |
| 5,209,256 A | 5/1993 | Thornburrow |
| 5,375,812 A | 12/1994 | Kent |
| 5,997,003 A | 12/1999 | Turner |
| 6,007,070 A | 12/1999 | Heathcott et al. |
| 6,161,834 A | 12/2000 | Pollack et al. |
| 6,202,668 B1 | 3/2001 | Maki |
| 6,250,604 B1 | 6/2001 | Robert |
| 6,345,805 B1 | 2/2002 | Chatufale |
| 6,422,568 B1 | 7/2002 | Kotlyar |
| 6,488,263 B2 | 12/2002 | Robert |
| 6,508,266 B2 | 1/2003 | Iritani et al. |
| 6,561,517 B2 | 5/2003 | James |

# METAL VALVE STEM SEAL AND SEALING SYSTEM

TECHNICAL FIELD

The present invention is directed to a novel and nonobvious metal valve stem seal and sealing system. In particular, the present invention is directed to an improved metal-to-metal valve stem seal for sealing between a movable valve stem and a bonnet member, and an improved sealing system that incorporates the metal-to-metal valve stem seal. The sealing system and metal valve stem seal of the present invention have particular application in the deep sea drilling of oil and gas. However, the present invention may be used as a sealing system for other fluids, such as water, and liquid and gaseous hydrocarbons, and for other suitable applications such as with risers which are those structures that connect the underwater sea line to the above water oil and gas drilling platforms.

BACKGROUND ART

Exploitation of deep sea oil and gas reservoirs has increased demand for sealing systems used with deep sea equipment that are reliable, durable, and provide an airtight seal to prevent leakage of oil and gas. The sealing systems must be able to withstand the continual loads applied during operation. Due to the complex deep sea manmade structures used for deep sea installations, maintenance of the sealing systems in the deep sea equipment is extremely expensive or even impossible to perform. To minimize or eliminate the need for maintenance and repair of the sealing systems in the deep sea equipment, all critical components of the sealing systems must exhibit continual reliability and durability to fully comply with the stringent requirements of zero emissions to the environment.

Known metal valve stem seals and sealing systems for use with oil and gas drilling and related applications have been developed prior to the present invention. However, such seals and sealing systems have disadvantages such as insufficient and inadequate sealing capacity under high pressure conditions, premature wearing resulting in less durability and reliability, more frequent maintenance and repair, increased damage to the sealing surfaces, and often the use of more expensive equipment. In addition, many known valve stem seals and sealing systems incorporate plastic or elastomeric materials in the sealing construction. Such plastic or elastomeric materials are less advantageous than metals when used in deep sea oil and gas drilling, due to the propensity for the plastic or elastomeric materials to wear out more easily and/or explode under high pressure conditions.

Accordingly, there is a need for a new and improved metal valve stem seal and sealing system that overcomes the problems associated with known valve stem seals and sealing systems.

SUMMARY OF INVENTION

The present invention satisfies these needs as well as provides a unique and advantageous metal valve stem seal and sealing system. None of the known metal valve stem seals or sealing systems provides all of the numerous advantages of the present invention.

In one aspect, the present invention is directed to a metal valve stem sealing system comprising: a valve body; a metal valve stem housed within the valve body; a bonnet member housed within the valve body; a U-shaped metal stem gasket positioned between the metal valve stem and the bonnet member, wherein the gasket has a first lip member and a second lip member each having an interior surface and an exterior surface; a metal wedge ring fitted between the interior surface of the first lip member and the interior surface of the second lip member; and, at least one metal energizing spring adjacent the wedge ring, wherein the metal energizing spring applies a sufficient force to the wedge ring causing the wedge ring to apply a sufficient contact pressure to the first and second lip members to expand the first and second lip members to form a seal between the gasket and the metal valve stem and to form a seal between the gasket and the bonnet member. In particular, the first lip member is mechanically forced by the wedge ring energized by the energizing spring to form a first airtight seal contact area between the first lip member and the exterior surface of the metal valve stem, and the second lip member is mechanically forced by the wedge ring energized by the energizing spring to form a second airtight seal contact area between the second lip member and the exterior surface of the bonnet member.

In another aspect, the invention is directed to a metal-to-metal seal for sealing between a movable valve stem and a bonnet member, where the metal seal comprises: a U-shaped metal stem gasket positioned between an exterior surface of the metal valve stem and an exterior surface of the bonnet member, wherein the gasket has a first flexible lip member and a second flexible lip member, the first and second lip members each having an interior surface, an exterior surface, an upper portion, and a lower portion, and further wherein the lower portion of each lip member has an exterior sloped surface; a metal wedge ring positioned between the interior surface of the first lip member and the interior surface of the second lip member to expand the lip members to form an airtight seal between the gasket and both the valve stem and bonnet member; and, at least one metal energizing spring positioned partially within the wedge ring, wherein the metal energizing spring applies a sufficient force to the wedge ring which causes the wedge ring to apply a sufficient contact pressure to the first and second lip members that mechanically forces the lower portions of the first and second lip members to rotate outwardly to form, respectively, a first airtight seal contact area between the first lip member and the exterior surface of the metal valve stem and a second airtight seal contact area between the second lip member and the exterior surface of the bonnet member.

The metal valve stem seal and sealing system may further comprise an anti-rotation pin attached to the metal stem gasket. The first and second lip members of the metal valve stem seal and sealing system may both further comprise upper portions and lower portions, wherein the lower portions are flexible and have exterior sloped surfaces adapted to ensure that when the contact pressure by the wedge ring against the lip members is applied, the lower portions of the first and second lip members rotate outwardly to increase the seal contact areas.

An object of the present invention is to provide an improved metal valve stem seal and sealing system that can withstand the most severe deep sea operating conditions, that is reliable, durable, wear resistant, provides an airtight seal to prevent leakage of oil and gas or another fluid, and that fully complies with the stringent requirements of zero emissions to the environment.

Another object of the present invention is to provide an improved metal valve stem seal and sealing system that minimizes or eliminates the need for maintenance and repair of the sealing system, achieving more permanence of function.

Another object of the present invention is to provide an improved metal valve stem seal and sealing system that requires no plastic or elastomeric material as a component of the seal or sealing system because such plastic or elastomeric material wears out more easily and can explode under high pressure conditions.

Another object of the present invention is to provide an improved metal valve stem seal and sealing system that can withstand an operating pressure of up to 20,000 psi.

Another object of the present invention is to provide an improved metal valve stem seal and sealing system that is mechanically energized through at least one energizing spring situated adjacent a wedge ring, thus providing the required contact stress or force on the sealing area to guarantee an airtight seal at low operating pressure which results in an overall longer life span for the metal valve stem seal and sealing system.

Another object of the present invention is to provide an improved metal valve stem seal and sealing system that is capable of accommodating any misalignment of part components that may occur during stem stroke and valve operations without becoming deformed.

These and other features, aspects and advantages of the present invention will become better understood from the following description and appended claims.

DETAILED DESCRIPTION OF INVENTION

The present invention is directed to a novel and nonobvious metal valve stem and sealing system. In particular, the present invention is directed to an improved metal-to-metal valve stem seal for sealing between a movable valve stem and a bonnet member, and an improved sealing system that incorporates the metal-to-metal valve stem seal. Preferably, the sealing system and metal valve stem seal of the present invention are used in deep sea equipment used with the drilling of oil and gas and subsea flow lines and pipelines. The present invention may be used with other fluids, such as water and liquid and gaseous hydrocarbons, and may be used for other suitable applications such as with risers which are those structures that connect the underwater sea line to the above water oil and gas drilling platforms.

Figure 1:
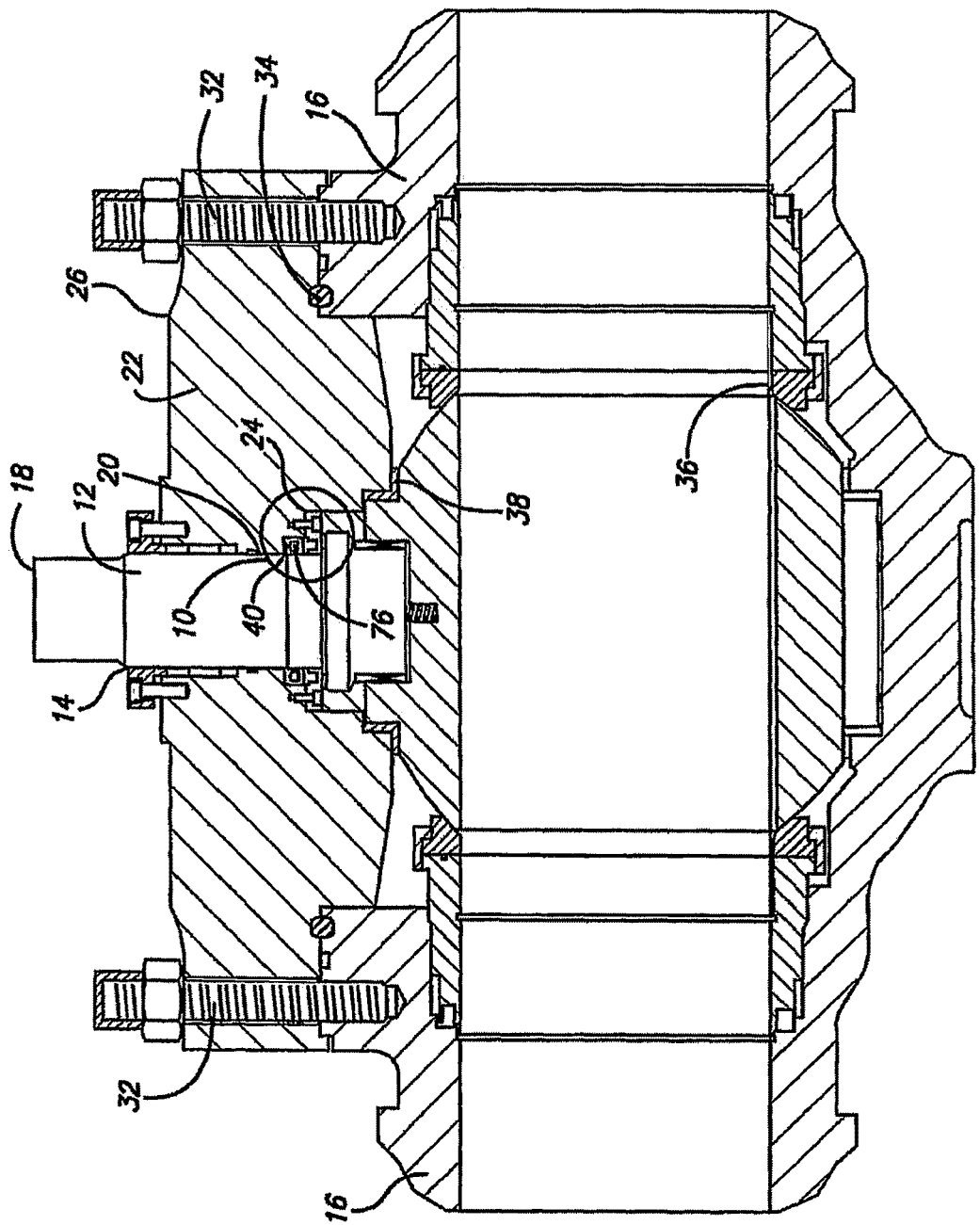
FIG. 1 is a sectional view of the metal valve stem seal and sealing system of the present invention.
Figure 2:
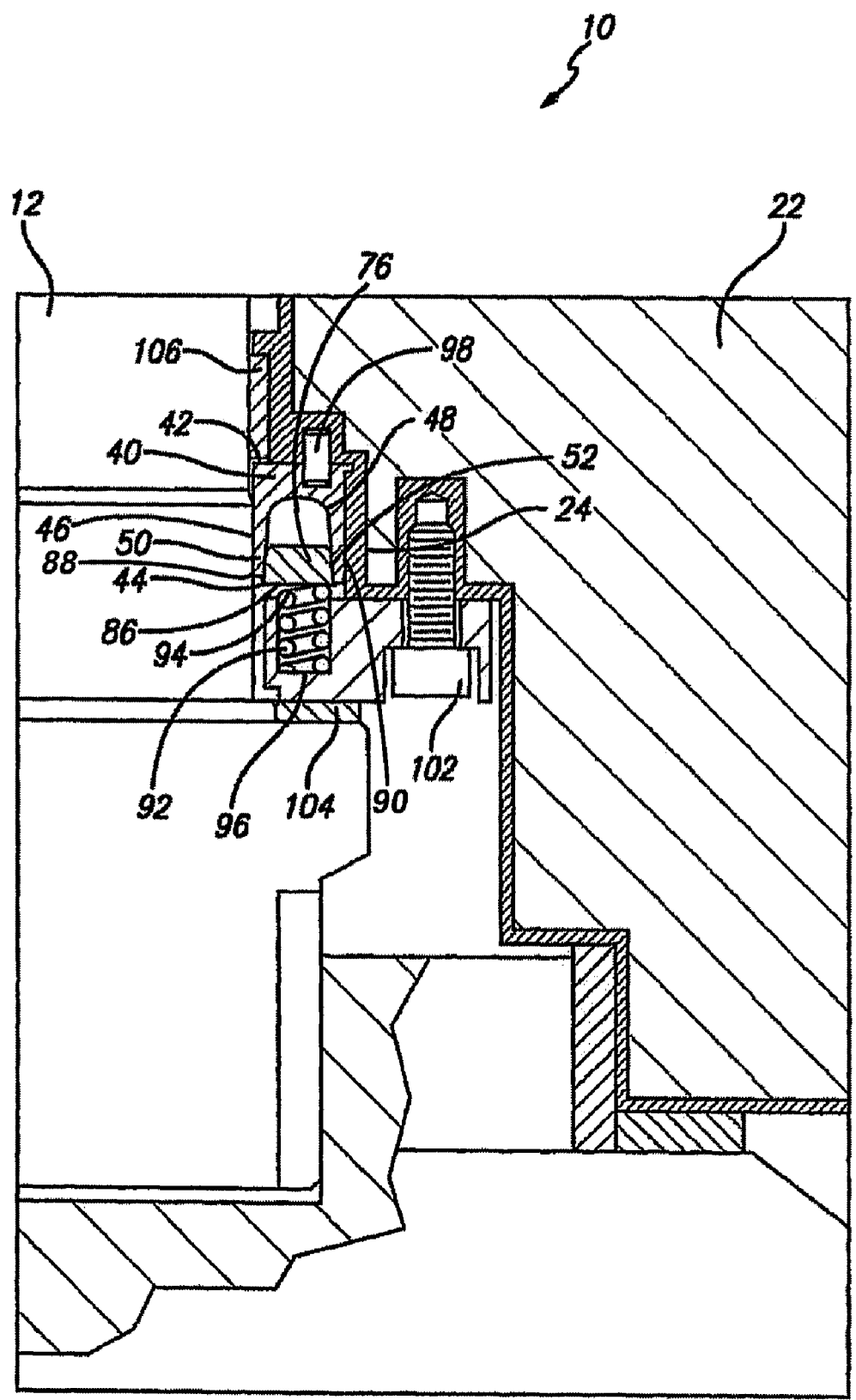
FIG. 2 is an enlarged sectional view of the metal valve stem seal shown in FIG. 1.

In an aspect of the present invention, a metal valve stem and sealing system 10 is provided, as shown in sectional view in its mechanical environment in FIG. 1, and as shown in an enlarged sectional view in FIG. 2. The metal valve stem and sealing system 10 is preferably made of high strength corrosion resistant alloys like Duplex SS (Stainless Steel) and Super Duplex SS (Stainless Steel), both of which can be obtained from Sanvik AB of Sweden, and Inconel 718 (nickel-based alloy), also known as UNS N07718 under the standard UNS (Unified Numbering System), which can be obtained from Haynes of Kokomo, Ind. However, other suitable corrosion resistant alloys may be used. The metal valve stem and sealing system of the present invention preferably do not have components constructed of plastic or elastomeric materials because metal is more durable and long lasting and does not explode under high pressure.

As shown in FIG. 1, the sealing system 10 comprises a movable metal valve stem 12 extending through a stem opening 14 within a valve body 16. The valve stem 12 has an interior surface 18 and an exterior surface 20. The valve stem 12 is comprised of metal. The valve stem is preferably coated with an alloy selected from the group of alloys comprising tungsten carbides and chromium carbides. However, other suitable alloys may also be used. The valve stem 12 may be a rotating stem, a rising stem, or another suitable movable stem. The diameter of the valve stem is preferably from about one inch to about ten inches in size.

The sealing system 10 can further comprise a bonnet member 22 housed within the valve body 16. The bonnet member 22 has an interior surface 24 and an exterior surface 26. The sealing system 10 can further comprise standard components such as stud nuts and bolts 32, bonnet gasket 34, seat ring 36, thrust bearing 38, and other suitable standard components.

Figure 4:
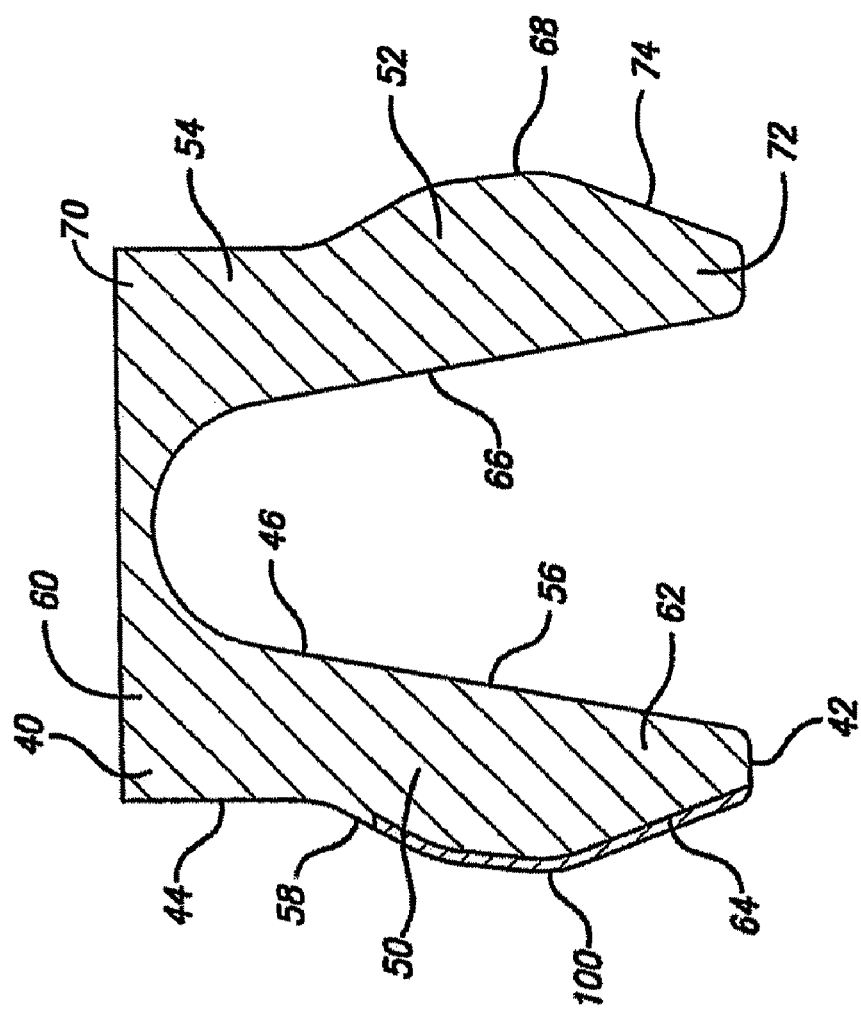
Figure 3:
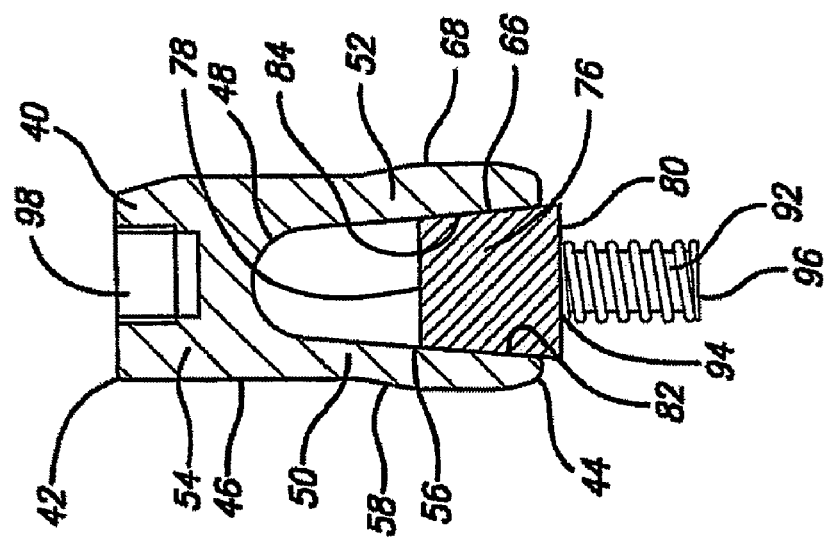
FIG. 3 is an enlarged sectional view of the U-shaped metal stem gasket, wedge ring and energizing spring of the present invention; and, FIG. 4 is an enlarged section view of the U-shaped metal stem gasket of the present invention.

As shown in FIG. 2, the sealing system 10 comprises a U-shaped metal stem gasket 40. FIGS. 3 and 4 show enlarged sectional views of the U-shaped metal stem gasket 40. The metal stem gasket 40 has a top portion 42, a bottom portion 44, an exterior portion 46, and an interior portion 48. The metal stem gasket 40 is positioned between the exterior surface 20 of the valve stem 12 and the exterior surface 26 of the bonnet member 22. The metal stem gasket 40 has a first lip member 50 and a second lip member 52 that both extend downwardly from a stem gasket body 54. The first lip member 50 has an interior surface 56, an exterior surface 58, an upper portion 60, and a lower portion 62. The lower portion 62 of the first lip member 50 has an exterior sloped surface 64. The second lip member 52 has an interior surface 66, an exterior surface 68, an upper portion 70, and a lower portion 72. The lower portion 72 of the second lip member 52 has an exterior sloped surface 74. The exterior sloped surfaces 64, 74 of the lower portions 62, 72 are flexible and are adapted to ensure that when the contact pressure is applied against the first and second lip members 50, 52, the lower portions 62, 72 of the first and second lip members 50, 52 rotate outwardly to create an airtight tight seal and to increase areas of sealing contact. In order to keep the contact stress within the optimal range, the lower portions 62, 72 are uniquely shaped to ensure that when internal pressure is increased, the lower portions 62, 72 rotate to extend the surface areas of contact. This unique design allows the resulting contact stress to be limited and guarantees that the performance of the sealing system is continually maintained throughout its life span. The diameter of the lower portions 62, 72 of the first and second lip members 50, 52 is preferably in the range of from about one inch to about ten inches in size.

The first lip member 50 is preferably coated on an exterior surface of the first lip member with an alloy coating 100 (shown in FIG. 4) selected from the group of alloys preferably comprising tungsten carbides and chromium carbides. However, other suitable alloys may also be used. Such alloy coating is advantageous because of its extreme resistance to abrasion and galling. To achieve the airtight seal during the metal seal's life, the exterior surfaces of both the first lip member 50 and the valve stem 12 are preferably coated with a suitable alloy that must withstand both chemical attack and severe wear, while also ensuring that any possible wearing away or corrosion between the airtight seal contact areas or two mating surfaces is eliminated. The first and second lip members 50, 52 are suitably flexible to provide the required performances. Both lips members 50, 52 are mechanically forced, by an interference fit against the respective surfaces of the valve stem 12 and the bonnet member 22 to form an airtight seal. An airtight seal is achieved with the present invention and such seal does not affect the movement of the valve stem 12. The sealing surfaces of the lip member 50, the valve stem 12, and the bonnet member 22 are preferably wear and corrosion resistant and durable from about twenty years to about fifty years in length and time. In addition, the metal seal and sealing system 10 are designed to accommodate any misalignment that may occur during valve stem stroke and valve operations without becoming deformed.

As shown in FIG. 2, the metal seal and sealing system 10 further comprise a uniquely designed wedge ring 76. FIG. 3 shows an enlarged sectional view of the wedge ring 76 of the present invention. The wedge ring is uniquely designed to provide expansion force or energization force to the lip members 50, 52 while self-locking is avoided. The wedge ring 76 has a top portion 78, a bottom portion 80, a first side portion 82, and a second side portion 84. The wedge ring 76 is comprised of metal, preferably selected from the group consisting of high strength corrosion resistant alloys, such as Duplex SS (Stainless Steel) and Super Duplex SS (Stainless Steel), both of which can be obtained from Sanvik AB of Sweden, and Inconel 718 (nickel-based alloy), also known as UNS N07718 under the standard UNS (Unified Numbering System), which can be obtained from Haynes of Kokomo, Ind. However, other suitable corrosion resistant alloys may be used. The diameter of the wedge ring 76 is preferably from about one inch to about ten inches in size.

The wedge ring 76 is fitted into position within the stem gasket 40. In particular, the first side portion 82 of the wedge ring 76 is in contact against the interior surface 56 of the first lip member 50, and the second side portion 84 of the wedge ring 76 is in contact against the interior surface 66 of the second lip member 52. The wedge ring 76 forms an airtight seal with the stem gasket 40. A first airtight seal contact area 88 is formed between the first lip member 50 and the valve stem 12. A second airtight seal contact area 90 is formed between the second lip member 52 and the bonnet member 22.

The metal seal and sealing system 10 of the present invention is based on an excellent compromise between the rigidity of the wedge ring 76 that mechanically forces the stem gasket 40 to follow movements of the valve stem 12, and the flexibility of the lip members 50, 52 that can accommodate minor radial displacements of the valve stem 12. The result is that the stem gasket 40 absorbs displacements of the valve stem 12 without permanent deformations of the lip members 50, 52.

The metal seal and sealing system 10 further comprise at least one metal energizing spring 92 positioned adjacent the bottom portion 80 of the wedge ring 76. The spring 92 is not within the wedge ring 76. FIG. 3 shows an enlarged sectional view of the energizing spring 92 of the present invention. The energizing spring 92 comprises an upper end 94 and a lower end 96. The energizing spring 92 is comprised of a metal preferably selected from the group consisting of corrosion resistant alloys, such as Inconel X750 also known as UNS N07750 under the standard UNS (Unified Numbering System) and Inconel 718 also known as UNS N07718 under the standard UNS (Unified Numbering System), both of which can both be obtained from Haynes of Kokomo, Ind., and Elgiloy also known as UNS R30003 under the standard UNS (Unified Numbering System), which can be obtained from Elgiloy Specialty Metals of Elgin, Ill. However, other suitable corrosion resistant alloys may be used. The metal seal and sealing system 10 have at least one energizing spring 92, and preferably have from about 4 to about 20 energizing springs. The diameter of the energizing spring is preferably from about one-quarter (¼) inch to about one (1) inch in size.

The energizing spring 92 applies a sufficient force to the wedge ring 76 to cause the wedge ring 76 to apply a sufficient contact pressure to the first and second lip members 50, 52. The wedge ring 76 is fitted between the interior surface of the first lip member 50 and the interior surface of the second lip member 52 so that the wedge ring 76 expands or energizes the lip members 50, 52 to form a seal between the gasket 40 and both the valve stem 12 and the bonnet member 22. The wedge ring 76 provides a wedging effect that expands the lip members 50, 52 and creates the required contact pressure between the first lip member 50 and the valve stem 12 and between the second lip member 52 and the bonnet member 22. When sufficient force is applied to the wedge ring 76, the wedge ring 76 mechanically forces the first lip member 50 to form the first airtight seal contact area 88 between the first lip member 50 and the exterior surface 20 of the valve stem 12. In addition, when sufficient force is applied to the wedge ring 76, the wedge ring 76 mechanically forces the second lip member 52 to form the second airtight seal contact area 90 between the second lip member 52 and the exterior surface 26 of the bonnet member 22. The wedge ring 76 of the present invention provides energization to the stem gasket 40 and also keeps the stem gasket 40 in position. The wedge ring 76 provides energization or expansion to the lip members 50, 52 which mechanically forces the exterior sloped surfaces 64, 74 of the lip members 50, 52 to be in substantially straight contact with the sealing surfaces of both the valve stem 12 and the bonnet 22.

The contact pressure applied to the contact areas 88, 90 is proportional to an operating pressure applied to the interior of the stem gasket 40. Thus, the contact pressure is kept at least equal to the valve operating pressure to achieve an airtight seal but not to exceed the structural strength of the carbide coating which is about 36,000 psi (pounds per square inch). This results in an increased life span of the sealing system and metal seal of the present invention over known sealing systems. The force applied by the energizing spring 92 to the wedge ring 76 is preferably in the range of from about 10 pounds (lbs.) to about 2000 pounds (lbs.). The gasket 40 and the wedge ring 76 can preferably withstand an operating pressure of up to 20,000 psi (pounds per square inch).

As shown in FIG. 3, the metal valve stem seal and sealing system 10 of the present invention may further comprise an anti-rotation pin 98 attached to the stem gasket 40. The anti-rotation pin 98 holds and maintains the stem gasket 40 in position and prevents the rotation of the stem gasket 40. The shape of the pin is preferably cylindrical in shape, and preferably, half of the pin 98 is positioned within the bonnet member 22 and half of the pin 98 is positioned within the stem gasket 40.

As shown in FIG. 2, the present metal seal and sealing system 10 can further comprise a cap screw 102, a thrust bearing 104, a stem bearing 106, and optional additional springs, spacers, plugs, covers or other standard component parts (not shown).

Another aspect of the present invention provides for the metal-to-metal seal 10 for sealing between the movable valve stem 12 and bonnet member 22. The metal seal 10 comprises the U-shaped metal stem gasket 40 positioned between the exterior surface 20 of the valve stem 12 and an exterior surface 26 of the bonnet member 22. The stem gasket 40 has flexible first and second lip members 50, 52. The first and second lip members 50, 52 have, respectively, interior surfaces 56, 66, exterior surfaces 58, 68, upper portions 60, 70, and lower portions 62, 72. The lower portions 62, 72 each have exterior sloped surfaces 64, 74. The metal seal 10 further comprises the metal wedge ring 76 positioned between the interior surface 56 of the first lip member 50 and the interior surface 66 of the second lip member 52 to energize or expand the lip members to form an airtight seal between the gasket 40 and both the valve stem 12 and bonnet member 22. The metal seal 10 further comprises at least one metal energizing spring 92 positioned adjacent the bottom of the wedge ring 76. The energizing spring 92 applies sufficient force to the wedge ring 76 which causes the wedge ring 76 to apply a sufficient contact pressure to the first and second lip members 50, 52 to mechanically force the lower portions 62, 72 of the lip members 50, 52 to rotate outwardly to form, respectively, first airtight seal contact area 88 between the first lip member 50 and the exterior surface 20 of the valve stem 12 and second airtight seal contact area 90 between the second lip member 52 and the exterior surface 26 of the bonnet member 22.

Although the present invention has been described in considerable detail with reference to certain preferred aspects thereof, other aspects of the invention are possible. Therefore, the scope of the appended claims should not be limited to the description of the preferred aspects contained herein.

What is claimed is:

1. A sealing system comprising:
    a valve body;
    a valve stem housed within the valve body;
    a bonnet member;
    a stem gasket positioned between the valve stem and the bonnet member, wherein the gasket has a first lip member and a second lip member each having an interior surface and an exterior surface, wherein the first and second lip members have upper portions and lower portions, and wherein the lower portion of each lip member has an exterior sloped surface;
    a wedge ring fitted between the interior surface of the first lip member and the interior surface of the second lip member; and
    at least one spring adjacent the wedge ring, wherein the spring applies a sufficient force to the wedge ring to cause the wedge ring to apply a sufficient contact pressure to the first and second lip members such that the exterior sloped surfaces of the first and second lip members rotate outwardly to extend, respectively, a first airtight seal contact area between the first lip member and the valve stem and a second airtight seal contact area between the second lip member and the bonnet member.

2. The stem sealing system of claim 1 further comprising an anti-rotation pin attached to the stem gasket.

3. The sealing system of claim 1 wherein the first lip member is coated on an exterior surface with an alloy selected from the group of alloys comprising tungsten carbides and chromium carbides.

4. The sealing system of claim 1 wherein the valve stem is coated on an exterior surface with an alloy selected from the group of alloys comprising tungsten carbides and chromium carbides.

5. The sealing system of claim 1 wherein the contact pressure is proportional to an operating pressure applied to the interior of the gasket.

6. The sealing system of claim 1 wherein the wedge ring is comprised of a metal selected from the group consisting of stainless steel and a nickel based alloy.

7. The sealing system of claim 1 wherein the spring is comprised of a metal selected from the group consisting of stainless steel and a nickel based alloy.

8. The sealing system of claim 1 having a plurality of springs.

9. The sealing system of claim 1 wherein the sealing system is used in deep sea gas and oil drilling, subsea flow lines and pipelines.

10. The sealing system of claim 1 wherein the force applied by the spring to the wedge ring is in the range of from about 100 pounds to about 2000 pounds.

11. The sealing system of claim 1 wherein the gasket and lip members can withstand an operating pressure of up to 20,000 psi.

12. The sealing system of claim 1 wherein the valve stem is a rotating stem.

13. The sealing system of claim 1 wherein the valve stem is a rising stem.

14. The sealing system of claim 1 further comprising a stem bearing adjacent a first top portion of the gasket; a spring and spring holder both adjacent a second top portion of the gasket; and a thrust bearing adjacent a lower end of the spring.

15. A sealing system comprising:
    a valve body;
    a valve stem extending through a stem opening within the valve body;
    a bonnet member;
    a stem gasket positioned between a surface of the valve stem and a surface of the bonnet member, wherein the gasket has a first lip member and a second lip member that both extend from a gasket body, the first and second lip members each having an interior surface and an exterior surface, wherein the first and second lip members have upper portions and lower portions, and wherein the lower portion of each lip member has an exterior sloped surface;
    a wedge ring fitted into position between the interior surface of the first lip member and the interior surface of the second lip member; and
    at least one spring positioned adjacent a bottom portion of the wedge ring, wherein the spring applies a sufficient force to the wedge ring to cause the wedge ring to apply a sufficient contact pressure to the first and second lip members such that the exterior sloped surfaces of the first and second lip members rotate outwardly to extend, respectively, a first airtight seal contact area between the first lip member and the valve stem and a second airtight seal contact area between the second lip member and the bonnet member.

16. The sealing system of claim 15 further comprising an anti-rotation pin attached to the stem gasket.

17. A seal for sealing between a valve stem and a bonnet member, the seal comprising:
    a stem gasket positioned between a surface of the valve stem and a surface of the bonnet member, wherein the gasket has a first flexible lip member and a second flexible lip member, the first and second lip members each having an interior surface, an exterior surface, an upper portion, and a lower portion, and further wherein the lower portion of each lip member has an exterior sloped surface;
    a wedge ring positioned between the interior surface of the first lip member and the interior surface of the second lip member; and
    at least one spring positioned adjacent the wedge ring, wherein the spring applies a sufficient force to the wedge ring which causes the wedge ring to apply a sufficient contact pressure to the first and second lip members such that the exterior sloped surfaces of the first and second lip members rotate outwardly to extend, respectively, a first airtight seal contact area between the first lip member and the surface of the valve stem and a second airtight seal contact area between the second lip member and the surface of the bonnet member.

18. The seal of claim 17 wherein the gasket and lip members can withstand an operating pressure of up to 20,000 psi.

19. The seal of claim 17 further comprising an anti-rotation pin attached to the stem.

* * * * *